United States Patent
Gupta et al.

(10) Patent No.: US 10,027,694 B1
(45) Date of Patent: Jul. 17, 2018

(54) DETECTING DENIAL OF SERVICE ATTACKS ON COMMUNICATION NETWORKS

(71) Applicant: Amazon Technologies, Inc., Seattle, WA (US)

(72) Inventors: Piyush Gupta, Issaquah, WA (US); Amit J. Mhatre, Seattle, WA (US); William Alexander Stevenson, Seattle, WA (US); Atulya S. Beheray, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 188 days.

(21) Appl. No.: 15/083,183

(22) Filed: Mar. 28, 2016

(51) Int. Cl.
    *H04L 29/06* (2006.01)
(52) U.S. Cl.
    CPC ...... *H04L 63/1416* (2013.01); *H04L 63/1425* (2013.01); *H04L 63/1458* (2013.01)
(58) Field of Classification Search
    CPC . H04L 63/0227; H04L 63/0236; H04L 63/14; H04L 63/1408; H04L 63/1416; H04L 63/1425; H04L 63/1441; H04L 63/1458
    See application file for complete search history.

(56) References Cited

U.S. PATENT DOCUMENTS

| | | | | |
|---|---|---|---|---|
| 8,997,227 B1* | 3/2015 | Mhatre | ............... | H04L 63/1416 726/23 |
| 9,628,512 B2* | 4/2017 | Prenger | ............... | H04L 63/1475 |
| 9,742,795 B1 | 8/2017 | Radlein et al. | | |
| 2008/0084295 A1* | 4/2008 | Libby | | |
| 2009/0024549 A1* | 1/2009 | Johnson | ............... | H04L 43/00 706/46 |
| 2015/0128263 A1* | 5/2015 | Raugas et al. | | |
| 2015/0341376 A1* | 11/2015 | Nandy | ............... | H04L 63/1408 726/23 |
| 2016/0014147 A1* | 1/2016 | Zoldi | ............... | H04L 63/1433 726/23 |
| 2016/0080404 A1* | 3/2016 | Kohout et al. | | |
| 2016/0191918 A1* | 6/2016 | Lai | ............... | H04N 19/13 375/240.02 |
| 2017/0118240 A1* | 4/2017 | Devi Reddy | ............ | G06N 7/005 |
| 2017/0126718 A1* | 5/2017 | Baradaran | ............ | H04L 63/1425 |
| 2017/0185866 A1* | 6/2017 | Gelbard | ............... | G06K 9/6218 |

* cited by examiner

*Primary Examiner* — Eric W Shepperd
(74) *Attorney, Agent, or Firm* — Knobbe Martens Olson & Bear LLP

(57) ABSTRACT

Systems and methods are described to enable detection of network attacks in communication networks. An attack detection system receives information regarding network traffic occurring at nodes of a communication network, and analyzes the information for anomalous traffic patterns. The attack detection system can use multiple, parallel metric evaluation units programmed to detect specific types of anomalies within traffic patterns. In one instance, a metric evaluation unit is programmed to detect changes in entropy for the traffic, as distributed according to a characteristic such as source address, protocol, or country of origin. Where the entropy of a set of traffic differs from historical averages by a large amount, such as by many standard deviations, the attack detection system may flag the traffic as indicative of an attack, even when the absolute volume of traffic has not changed.

21 Claims, 5 Drawing Sheets

DETECTING DENIAL OF SERVICE ATTACKS ON COMMUNICATION NETWORKS

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization or public data centers operated on behalf, or for the benefit of, the general public.

Service providers or content creators (such as businesses, artists, media distribution services, etc.) can employ a series of interconnected data centers to deliver content (such as web sites, web content, or other digital data) to users or clients. These interconnected data centers are sometimes referred to as "content delivery networks" (CDNs) or content delivery systems. Existing routing and addressing technologies can enable multiple data centers associated with a content delivery system to provide similar or identical content to client computing devices. In some instances, each data center providing a set of content may be referred to as a point-of-presence ("POP"). A content delivery system can maintain POPs over a wide area (or worldwide) to enable the system to efficiently service requests from clients in a variety of locations.

Malicious entities occasionally attempt to disrupt the operations of service providers or content creators via network-based attacks ("network attacks"). One mechanism for doing so is a "denial of service" (DoS) attack. These attacks generally attempt to make a target computing device or network resource, such as a web site, unavailable to legitimate clients. One common instance of a DoS attack involves saturating the target device or network with external communications requests, such that it cannot respond to legitimate traffic, or it responds so slowly as to be rendered effectively unavailable. Because of the number of requests required to mount such an attack, responsibility for implementing the attack is often distributed across many computing devices. These distributed attacks are therefore known as "distributed denial of service" (DDoS) attacks. Because attacked targets, such as specific web sites or domain names, are often hosted or associated with a content delivery system, that system itself may also be targeted by the attack. Further, the content delivery system often hosts content on behalf of non-targeted systems or networks, which may also be affected by the attack due to their use of the content delivery system.

Because network attacks frequently attempt to oversaturate a target network, the content and form of the attack can vary. In some instances, data transmitted as part of an attack can be formed to resemble legitimate traffic. Thus, it can be difficult for both automated and manual systems to distinguish network attacks from legitimate traffic. Often, mitigation of a network attack involves discarding data assumed to form part of an attack. Thus, falsely identifying a network attack can result in legitimate traffic being discarded, which is of course undesirable. On the other hand, failing to quickly identify a network attack can result in resources becoming overloaded and unable to service legitimate requests, which is also undesirable.

DETAILED DESCRIPTION

Figure 1:
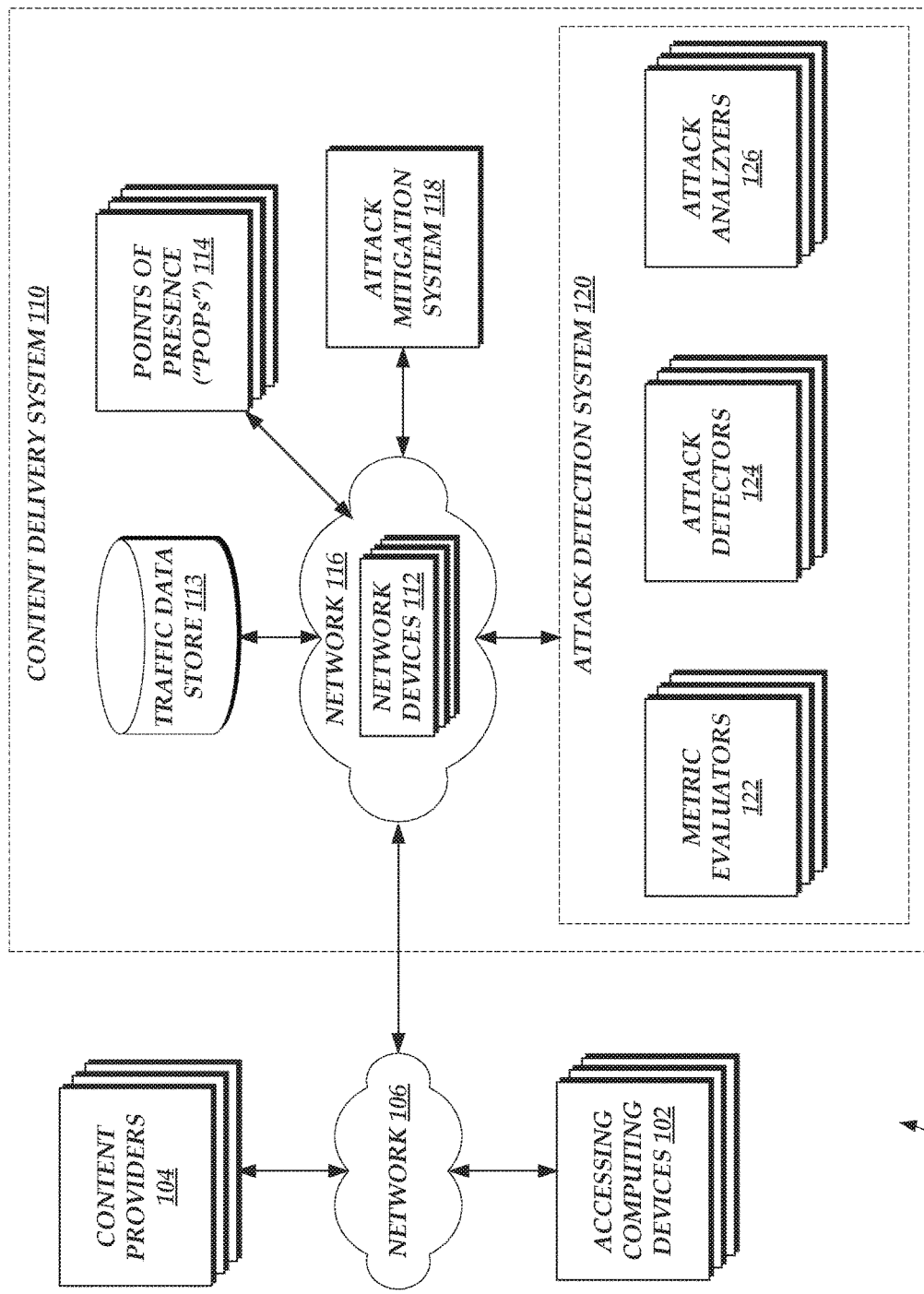
FIG. 1 is a block diagram depicting an illustrative logical network environment including multiple accessing computing devices and content providers, as well as a content delivery system including multiple points-of-presence, attack mitigators, and an attack detection system including metric evaluators.

Generally described, the present disclosure relates to identifying the occurrence of network attacks, such as denial of service ("DoS") attacks, on a communications network. More specifically, aspects of the present disclosure relate to identifying such network attacks within a content delivery system by evaluating traffic within the system to determine anomalies indicative of an attack. Generally, the distribution of network traffic to or through a network node (e.g., a router, a destination server, etc.) is relatively stable over time, even while the characteristics of portions of the traffic change. For example, while the source that transmits the most traffic to a destination server may vary with time, the amount of traffic from that source relative to the next-highest traffic source is somewhat more stable. One way to measure the stability of a distribution is by calculating the distribution's entropy, which provides a value for a given distribution (e.g., traffic from each source address over a first period of time) that can be compared to other distributions (e.g., traffic from each source address over a second period of time). Where the entropy of traffic distributions on a system changes rapidly, that change can be indicative of a network attack. For example, where the top source address transmitting traffic to a given destination server rapidly dwarfs all other traffic transmitted to that server, the entropy of traffic distributed according to source address will change quickly, indicating a potential network attack. As will be described below, the present disclosure provides an attack detection system that can monitor entropy of traffic across a communications network, as distributed according to various criteria, to detect network attacks. In some instances, the attack detection system may additionally or alternatively monitor other aspects of network traffics, such as surges or spikes in various types of traffic at a particular point, to detect network attacks. Still further, the attack detection system may itself, or in conjunction with other systems, generate information regarding a particular attack (such as an attack "signature") and act to mitigate the attack, thus preventing overload of the attack target (e.g., a specific website, server, etc.). As will be described in detail below, the attack detection system can, utilizing the methods described herein, detect network attacks quickly, with high accuracy, and with little or no impact on normal operation of a content delivery system.

To detect network attacks, the attack detection system can gather network traffic information from a variety of locations within a network. Each location may correspond, for example, to a "node" within the network, which may include routers, switches, servers, or any other communication device to or over which network traffic flows. As described below, the attack detection system can then evaluate the traffic observed at a location to determine whether the location is experiencing a network attack. For the purposes of the present disclosure, a location can be described as experiencing a network attack when traffic corresponding to the attack is detected at that location, regardless of whether the location is the intended target of the attack. For example, a router processing attack-related traffic can be described as experiencing a network attack, even if that traffic is intended for delivery to a distinct server. In accordance with embodiments of the present disclosure, each location can gather and report traffic information regarding traffic observed (e.g., received at, processed at, forwarded by, etc.) the location. Illustratively, a router can publish information regarding flows observed at the router. Generally described, a "flow" corresponds to a series of data packets that share common attributes, such that the packets are assumed to be interrelated. For example, CISCO SYSTEMS INC.® provides a NetFlow function that defines flows as sharing an ingress interface, source internet protocol (IP) address, destination IP address, IP protocol, source port, destination port, and type of service. Each monitored location (e.g., router) within a content distribution network can report data regarding observed flows to a database or other data storage system. Data for a given flow can include, but is not limited to, the characteristics used to define the flow, the number of bytes within the flow, the number of packets within the flow, average packet size of the flow, the start time of the flow, the end time of the flow, the bits per second of the flow, the packets per second of the flow, the number of requests per second of the flow, and the frequency at which packets, bits, or requests of the flow are observed. In some embodiments, a location may report information for all flows. In other embodiments, a location may report information for only a top n flows observed at a location (e.g., as defined by volume of bytes or data packets). Because flows of network traffic frequently follow power-law distributions, reporting only a top n flow can capture data regarding a majority of traffic observed at a location, while significantly decreasing the amount of data required to describe such flows. In some instances, the number n of flows reported may be static and manually specified (e.g., the top 200 flows). In other instances, the number n of flows reported may be dynamically selected by the location (e.g., such that it describes at least a threshold percentage of data observed at the location).

The data for flows observed at various locations can be aggregated at one or more databases or data sources, and made available to the attack detection system. Specifically, the attack detection system can include a set of metric evaluators that evaluate the recorded flows to detect a network attack at a given location. In one embodiment, each metric evaluator can be tasked with evaluating a single "metric" or characteristic of flows observed at a given location. For example, a first metric evaluator can be programmed to evaluate data observed at a location according to destination IP address, a second metric evaluator can be programmed to evaluate data observed at a location according to protocol, a third metric evaluator can be programmed to evaluate data observed at a location according to packet size, etc. Further, different metric evaluators may be programmed to evaluate the same metric according to different algorithms. For example, a first metric evaluator may be programmed to detect spikes in traffic according to traffic protocol (e.g., a spike in transmission control protocol ["TCP"] traffic), while a second metric evaluator may be programmed to detect large changes in entropy from a distribution of traffic protocols (e.g., a relative increase in TCP traffic as compared to user datagram protocol ["UDP"] traffic). Still further, different metric evaluators can be assigned to evaluate traffic from different locations. For example, a first metric evaluator can evaluate traffic from a first location while a second metric evaluator can evaluate traffic from a second location. Advantageously, the use of different metric evaluators to process data of different locations, different metrics, and different algorithms can enable the attack detection system to be easily scalable, such that additional metric evaluators can be added or removed from the system. In some embodiments, the same metric evaluator may be used to evaluate traffic data from multiple locations, corresponding to multiple metrics, or according to multiple algorithms. Further, in some instances, multiple evaluators may be used to evaluate data from the same location, according to the same metric, or according to the same algorithm. Each metric evaluator may process traffic data from one or more locations, aggregated with respect to one or more metrics, and evaluated according to one or more algorithms, in order to detect anomalous activity at a given location. For example, a metric evaluator can detect that entropy with respect to data protocol (e.g., as measured in bits per second, packets per second, or requests per second) at a location has shifted rapidly relative to prior shifts, thus indicating anomalous activity. The attack detection system can then utilize the anomalous activity to detect a network attack.

Specifically, the attack detection system can include one or more attack detectors that utilize anomaly information, as reported by metric evaluators, to flag a location as experiencing a network attack. In one embodiment, an attack detector can be programmed to require a threshold number of anomalies (e.g., at least two) within a threshold period (e.g., 2 minutes) before flagging a location as under attack. Thus, detection of a single anomaly by a metric evaluator may not flag a location as experiencing an attack. Further, an attack detector can be programmed to require that anomalies used to flag a location as under attack be unrelated. For example, an anomalous spike in TCP traffic and an anomalous spike in traffic to TCP port 80 can be considered related, and thus, not satisfying the required threshold. Relations between different anomaly types may be manually specified (e.g., by an operator of the attack detection system) or automatically determined by the attack detectors (e.g., by evaluating historical data to determine that highly correlated anomalies are related). The attack detectors, additionally or in alternative to utilizing anomaly thresholds, may also utilize other algorithms or techniques for identifying network attacks on a location according to anomaly data. For example, attack detectors may utilize machine learning techniques to process historical anomaly data and determine, for any newly detected anomaly, the probability that the anomaly corresponds to an attack. In one embodiment, an attack detector may process anomalies corresponding to a single location. In another embodiment, an attack detector may process anomalies corresponding to multiple locations.

After detecting an attack, the attack detection system may further gather information corresponding to the attack. The attack detection system can therefore include one or more attack analyzers. An attack analyzer can be notified of an attack observed at a location by the attack detectors. Thereafter, the attack analyzer can determine one or more targets of the attack. Illustratively, the attack analyzer may utilize traffic information reported by the location at which the attack is observed (e.g., flows observed at the location) to determine a destination network address (e.g., IP address) associated with the anomalous data. For example, where an attack was detected based at least in part on a spike in UDP traffic at a location, the attack analyzer may determine one or more destinations IP to which a large portion of the UDP traffic is directed, and determine that those IPs correspond to the target of the attack. In some embodiments, the attack analyzer may further attempt to generate information regarding the attack, in order to enable more efficient mitigation of the attack. For example, the attack analyzer may record values for anomalous traffic corresponding to the attack was detected (e.g., a specific destination network address, source network address, protocol, packet size, etc.), and associate that value with the attack. In some instances, the attack analyzer may be configured to automatically generate a signature for packets associated with the attack. Systems and methods for automatically generating such a signature are described in more detail in U.S. Pat. No. 8,997,227, entitled "ATTACK TRAFFIC SIGNATURE GENERATION USING STATISTICAL PATTERN RECOGNITION" (the '227 Patent). In addition, the attack analyzer may notify one or more mitigation devices within the content delivery system of the attack, as well as any data regarding the attack (e.g., associated values, an attack signature, etc.), to enable the mitigation device to begin mitigating the attack.

While examples are provided herein with respect to content distribution systems, embodiments of the present application may be implemented with respect to any network of computing devices that operates to serve content to client computing devices. Moreover, while some examples are provided with respect to a content distribution network as a whole, embodiments of the present application may also be implemented in whole or in part by discrete portions of the content delivery system. For example, each point of presence ("POP") within a content delivery system may implement an instance of an attack detection system. Thus, the examples provided herein are intended to be illustrative, and not exhaustive, in nature.

As will be appreciated by one of skill in the art in light of the description above, the embodiments disclosed herein substantially increase the ability of computing systems, such as content delivery systems, to identify and mitigate network attacks that would otherwise impair the function of a communication network and the computing systems themselves. Thus, the presently disclosed embodiments represent an improvement in the functioning of such computing systems, by enabling content delivery systems or other networked devices to continue to service legitimate client requests even while receiving large numbers of illegitimate requests. Moreover, the presently disclosed embodiments address technical problems inherent within computing systems; specifically, the limited ability of computing systems to process network-based requests and the difficulty in distinguishing legitimate network transmissions from those associated with malicious attacks. These technical problems are addressed by the various technical solutions described herein, including the utilization of metric evaluators to receive traffic information from various locations, parse the information according to a variety of metrics, and to detect anomalies within those metrics according to different algorithms (e.g., spike detection algorithms, entropy detection algorithms, etc.), and the utilization of attack detectors to identify attacks at a location based on detected anomalies. Thus, the present application represents a substantial improvement on existing network systems and computing systems in general.

The foregoing aspects and many of the attendant advantages of the present disclosure will become more readily appreciated as the same become better understood by reference to the following, when taken in conjunction with the accompanying drawings.

FIG. 1 is a block diagram depicting an illustrative logical network environment 100 including multiple accessing computing devices 102 and multiple content providers 104 in communication with a content delivery system 110 via a network 106. While the accessing computing devices 102 and the content providers 104 are shown as a group within FIG. 1, the accessing computing devices 102 and content providers 104 may be geographically distant, and independently owned or operated. For example, the accessing computing devices 102 could represent a multitude of users in various global, continental, or regional locations accessing the content delivery system 110. Further, the content providers 104 could represent a multitude of related or distinct parties that have associated with the content delivery system 110 to provide content, such as web sites, multimedia, or other digital, network-deliverable content to the accessing computing devices 102. Accordingly, the groupings of accessing computing devices 102 and content providers 104 within FIG. 1 is intended to represent a logical, rather than physical, grouping. Similarly, each of the components of the content delivery system 110 may be located within geographically diverse areas. For example, the content delivery system 110 can contain POPS 114 at a variety of globally, continentally, or regionally distinct locations, in order to provide a wide geographical presence for the content delivery system 110.

Network 106 may be any wired network, wireless network, or combination thereof. In addition, the network 106 may be a personal area network, local area network, wide area network, cable network, satellite network, cellular telephone network, or combination thereof. In the example environment of FIG. 1, network 106 is a global area network (GAN), such as the Internet. Protocols and components for communicating via the other aforementioned types of communication networks are well known to those skilled in the art of computer communications and thus, need not be described in more detail herein. While each of the accessing computing devices 102, content providers 104, and content delivery system 110 is depicted as having a single connection to the network 106, individual components of the accessing computing devices 102, content providers 104, and content delivery system 110 may be connected to the network 106 at disparate points. Accordingly, communication times and capabilities may vary between the components of FIG. 1.

Accessing computing devices 102 may include any number of different computing devices capable of communicating with the content delivery system 110. For example, individual accessing computing devices may correspond to a laptop or tablet computer, personal computer, wearable computer, server, personal digital assistant (PDA), hybrid PDA/mobile phone, mobile phone, electronic book reader, set-top box, camera, digital media player, and the like. Further, accessing computing devices 102 may include devices utilized by both legitimate clients of the content delivery system 110 and devices utilized by malicious parties to undertake network-based attacks, such as DoS attacks, on the content delivery system 110.

Content providers 104 may include any computing device owned or operated by an entity that has provided content to the content delivery system 110 for subsequent transmission to client computing devices (which may include one or more accessing computing devices 102). For example, content providers 104 may include servers hosting web sites, streaming audio, video, or multimedia services, data analytics services, or other network-accessible services. While illustratively shown in FIG. 1 as a network-attached computing device, content providers 104 may additionally or alternatively provide content to the content delivery system 110 via non-networked communication channels (e.g., via physical delivery of data).

The content delivery system 110 can include a variety of components and devices configured to enable accessing computing devices 102 to access content provided to the content delivery system 110 by the content providers 104. Specifically, the content delivery system 110 can include a number of POPs 114 configured to host content provided by the content providers 104. Each POP 114 may include a variety of computing devices configured to serve content to accessing computing devices 102. Accordingly, though not shown in FIG. 1, each POP 114 may include any number of processors, data stores, or networking components operating in conjunction to facilitate retrieval of content. Each POP 114 may communicate with content providers 104 and accessing computing devices 102 via a network 116 under control of or associated with the content delivery system 110. As in the case of the network 106, the network 116 may be any wired network, wireless network, or combination thereof. In addition, the network 116 may be a personal area network, local area network, wide area network, cable network, satellite network, cellular telephone network, or combination thereof. The network 116 may include a variety of interconnected network devices 112 that collectively (either exclusively or in addition with other devices not shown in FIG. 1) implement the network 116 configured to communicate data between the network 106 and the components of the content delivery system 110, including the POPs 114. The network devices 112 may include any of a variety of well-known devices, such as routers, switches, bridges, hubs, etc. As will be appreciated by one of skill in the art, the network devices 112 and the POPs 114 have limited computing power, and thus, a capacity to process transmissions from accessing computing devices 102. Accordingly, the network devices 112 and POPs 114 may be susceptible to network attacks, such as DoS attacks, that attempt to overwhelm the network devices 112 and POPs 114 with malicious, illegitimate data.

In accordance with embodiments of the present disclosure, the content delivery system 110 can therefore include a number of components configured to detect, analyze, and mitigate network attacks on the content delivery system 110. Specifically, the content delivery system 110 includes a traffic data store 113 configured to store information regarding traffic observed at the network devices 112, an attack detection system 120 configured to utilize the traffic information of the traffic data store 113 to detect and analyze network attacks, and an attack mitigation system 118 configured to mitigate the attack. Operation of each of the traffic data store 113, the network devices 112, and the attack detection system 120 will be described in more detail below. The attack mitigation system may include any one or more components configured to mitigate an attack on the content delivery system 110. One example of an attack mitigation system that can be utilized in conjunction with embodiments of the present disclosure is provided by U.S. Pat. No. 9,742,795, entitled "MITIGATING NETWORK ATTACKS" (the "'795 Patent").

The traffic data store 113 may include one or more physical data stores, which may correspond to any persistent or substantially persistent data storage, such as a hard drive (HDD), a solid state drive (SDD), network attached storage (NAS), a tape drive, or any combination thereof, and which are configured to store data received from the network devices 112 and make that data available to the attack detection system 120. In one embodiment, the traffic data store 113 is a database, various examples of which are known in the art. In another embodiment, the traffic data store 113 is high-throughput, distributed message queue system that enables continuous reception of data streams, and facilitates querying of those streams according to a variety of parameters in real-time (e.g., with little or no substantive delay).

The attack detection system 120 can include components configured to utilize the data within the traffic data store 113 to detect and analyze network attacks. Specifically, the attack detection system 120 includes a plurality of metric evaluators 122, attack detectors 124, and attack analyzers 126. In one embodiment, the metric evaluators 122, attack detectors 124, and attack analyzers 126 may be implemented in a common computing device implementing respective instances of the metric evaluators 122, attack detectors 124, and attack analyzers 126. In another embodiment, any one or more of the metric evaluators 122, attack detectors 124, and attack analyzers 126 may be embodied in a plurality of components, each executing an instance of the respective metric evaluators 122, attack detectors 124, and attack analyzers 126. A server or other computing component implementing any one or more of the metric evaluators 122, attack detectors 124, and attack analyzers 126 may include a network interface, memory, processing unit, and computer readable medium drive, all of which may communicate which each other may way of a communication bus. The network interface may provide connectivity over the network 116 and/or other networks or computer systems. The processing unit may communicate to and from memory containing program instructions that the processing unit executes in order to operate the respective metric evaluators 122, attack detectors 124, and attack analyzers 126. The memory may generally include random-access memory ("RAM"), read-only memory ("ROM"), other persistent and auxiliary memory, and/or any non-transitory computer-readable media.

It will be appreciated by those skilled in the art that the content delivery system 110 may have fewer or greater components than are illustrated in FIG. 1. In addition, the content delivery system 110 could include various web services and/or peer-to-peer network configurations. Thus, the depiction of the content delivery system 110 in FIG. 1 should be taken as illustrative. For example, in some embodiments, components of the content delivery system 110, such as the traffic data store 113 or the attack detection system 120, may be executed by one more virtual machines implemented in a hosted computing environment. A hosted computing environment may include one or more rapidly provisioned and released computing resources, which computing resources may include computing, networking and/or storage devices. A hosted computing environment may also be referred to as a cloud computing environment.

Figure 2:
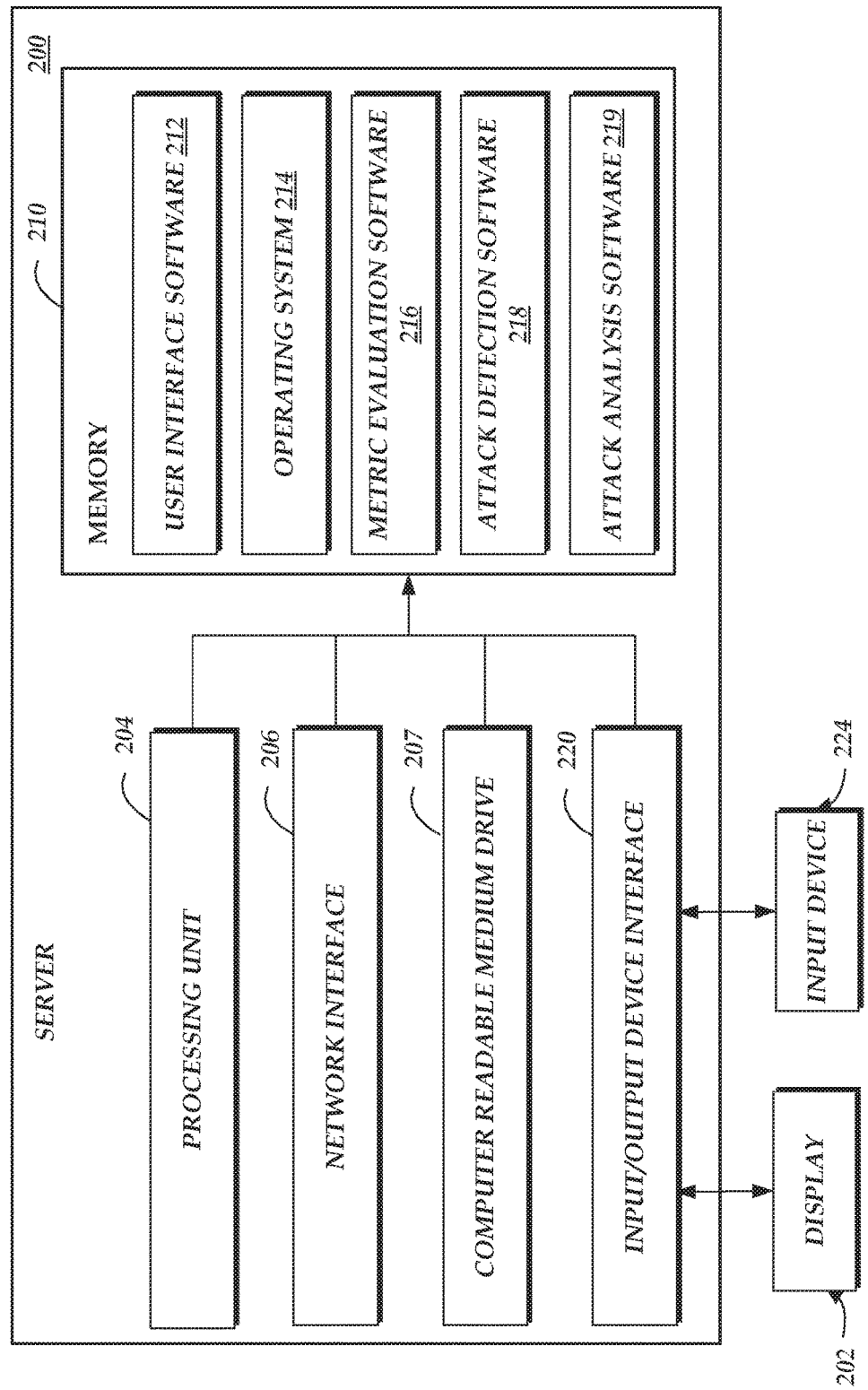
FIG. 2 is a block diagram depicting an illustrative configuration of one embodiment of an attack detection system of FIG. 1.

FIG. 2 depicts one embodiment of an architecture of a server 200 that may implement the attack detection system 120 described herein. The general architecture of server 200 depicted in FIG. 2 includes an arrangement of computer hardware and software components that may be used to implement aspects of the present disclosure. As illustrated, the server 200 includes a processing unit 204, a network interface 206, a computer readable medium drive 207, an input/output device interface 220, a display 202, and an input device 224, all of which may communicate with one another by way of a communication bus. The network interface 206 may provide connectivity to one or more networks or computing systems, such as the network 116 of FIG. 1. The processing unit 204 may thus receive information and instructions from other computing systems or services via a network. The processing unit 204 may also communicate to and from memory 210 and further provide output information for an optional display 202 via the input/output device interface 220. The input/output device interface 220 may also accept input from the optional input device 224, such as a keyboard, mouse, digital pen, etc. In some embodiments, the server 200 may include more (or fewer) components than those shown in FIG. 2. For example, some embodiments of the server 200 may omit the display 202 and input device 224, while providing input/output capabilities through one or more alternative communication channel (e.g., via the network interface 206).

The memory 210 may include computer program instructions that the processing unit 204 executes in order to implement one or more embodiments. The memory 210 generally includes RAM, ROM and/or other persistent or non-transitory memory. The memory 210 may store an operating system 214 that provides computer program instructions for use by the processing unit 204 in the general administration and operation of the server 200. The memory 210 may further include computer program instructions and other information for implementing aspects of the present disclosure. For example, in one embodiment, the memory 210 includes user interface software 212 that generates user interfaces (and/or instructions therefor) for display upon a computing device, e.g., via a navigation interface such as a web browser installed on the computing device. In addition, memory 210 may include or communicate with one or more auxiliary data stores, such as data store 113.

In addition to the user interface module 212, the memory 210 may include metric evaluation software 216, attack detection software 218, and attack analysis software 219 that may be executed by the processing unit 204. In one embodiment, the metric evaluation software 216, attack detection software 218, and attack analysis software 219 implement various aspects of the present disclosure, e.g., detecting anomalous traffic over network devices, identifying network attacks based on that anomalous traffic, and analyzing such network attacks. While the metric evaluation software 216, attack detection software 218, and attack analysis software 219 are shown in FIG. 2 as part of the server 200, in other embodiments, all or a portion of the software may be implemented by alternative computing devices within the content delivery system 110, such as virtual computing devices within a hosted computing environment, or as part of the computing devices 102.

Figure 3:
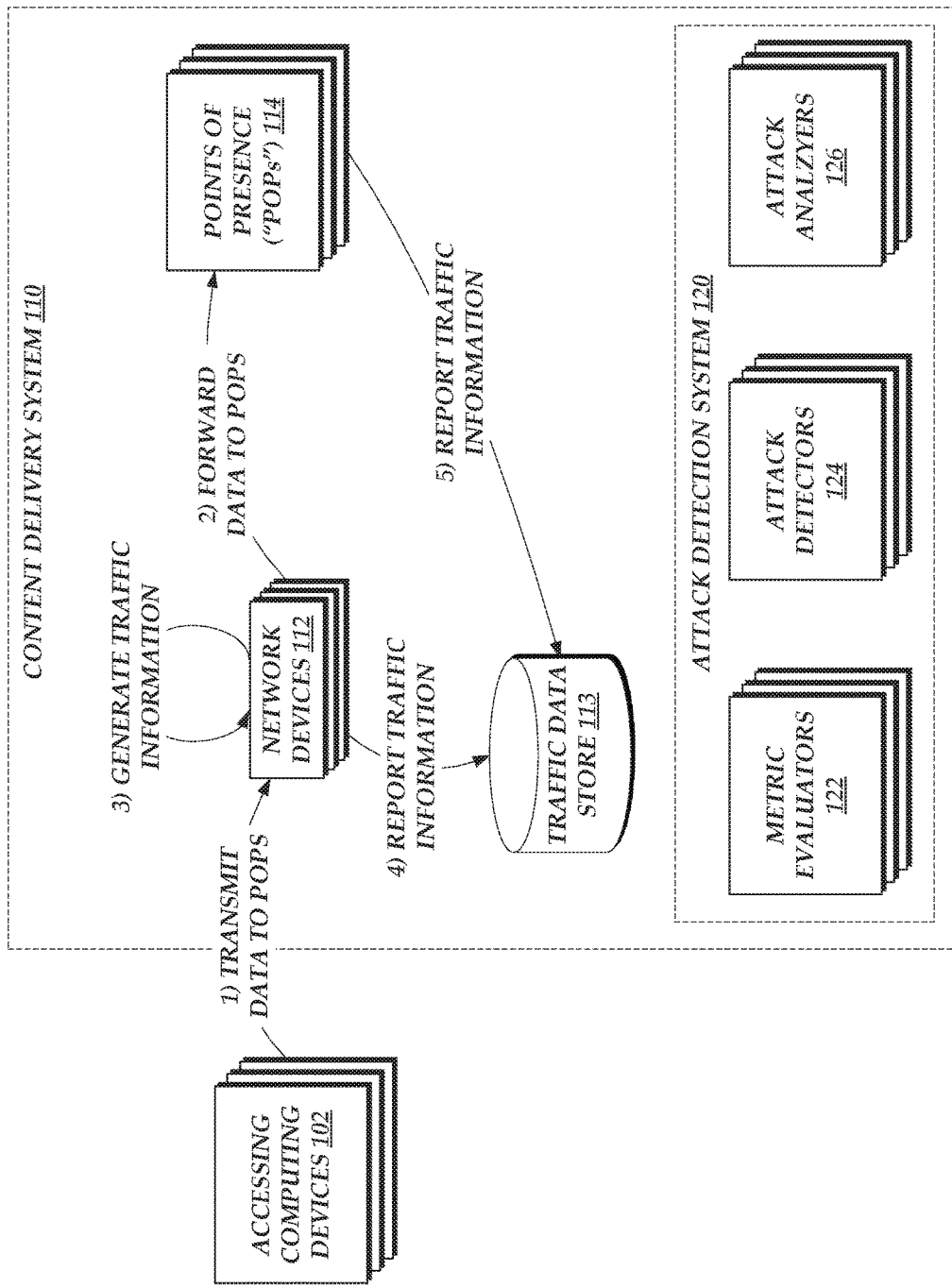
FIG. 3 is a block diagram depicting illustrative interactions of the content delivery system of FIG. 1 to record traffic metrics that can be used to identify network attacks on the content delivery system.

FIG. 3 depicts a set of illustrative interactions for gathering traffic information regarding the content delivery system 110, which can then be utilized by the attack detection system 120 to identify network attacks. Specifically, the interactions of FIG. 3 reflect access of the content delivery system 110 by accessing computing devices 102 in order to retrieve data from the points of presence 114. The interactions begin at (1), where the accessing computing devices 102 transmit data (e.g., over the network 106, not shown in FIG. 3) to the network devices 112 for delivery to the POPs 114. In some instances, such as when no POP 114 is under attack, the data transmitted by the accessing computing devices 102 may be entirely or largely legitimate data. Illustratively, the transmitted data may include requests for content, such as web pages, from the POPs 114. In other instances, such as where a network attack is occurring, at least a portion of the data may be illegitimate and form part of a network attack. At (2), the network devices 112 forward the transmitted data to their destination POPs 114 in accordance with standard networking protocols and functionality, thus enabling the accessing computing devices 102 to interact with the POPs 114.

Further, at (3), the network devices 112 generate traffic information corresponding to the data transmitted between the accessing computing devices 102 and the POPs 114. In one embodiment, the traffic information may include a raw log of the transmitted data, such as a "packet capture." However, execution of a packet capture at a network device 112 may require a high amount of computing power, and thus may be undesirable. Accordingly, in another embodiment, the traffic information may be a record of various "flows" processed by each network device 112. As noted above, a "flow" generally corresponds to a series of data (e.g., data packets) that share common attributes, such that the data is assumed to be interrelated. For example, each data unit of a flow may share an ingress interface, source internet protocol (IP) address, destination IP address, IP protocol, source port, destination port, and type of service. By aggregating traffic information according to flows, the total computing power required by a network device 112 may be reduced, and the generation of traffic information at the network devices 112 may have little or no impact on other operations of those devices 112. In one embodiment, a network device 112 may generate traffic information according to CISCO SYSTEM'S NetFlow functionality.

Thereafter, at (4), the network devices 112 can report the traffic information to the traffic data store 113. The traffic data store 113 may then store the traffic information, and make sure information is available to the attack detection system 120 for use in detecting network attacks observed at the network devices 112. In addition, at (5), the POPs 114 themselves may report traffic information regarding interaction with accessing computing devices. This traffic information may include, for example, server logs regarding interactions with various accessing computing devices 102.

While the interactions of FIG. 3 are described above sequentially, it is contemplated that each of the interactions may repeatedly occur, and that these interactions may occur at least in part concurrently. For example, the network devices 112 may continuously generate traffic information regarding observed flows, and report such information to the traffic data store 113, while concurrently enabling communications between the accessing computing devices 102 and the POPs 114.

Figure 4:
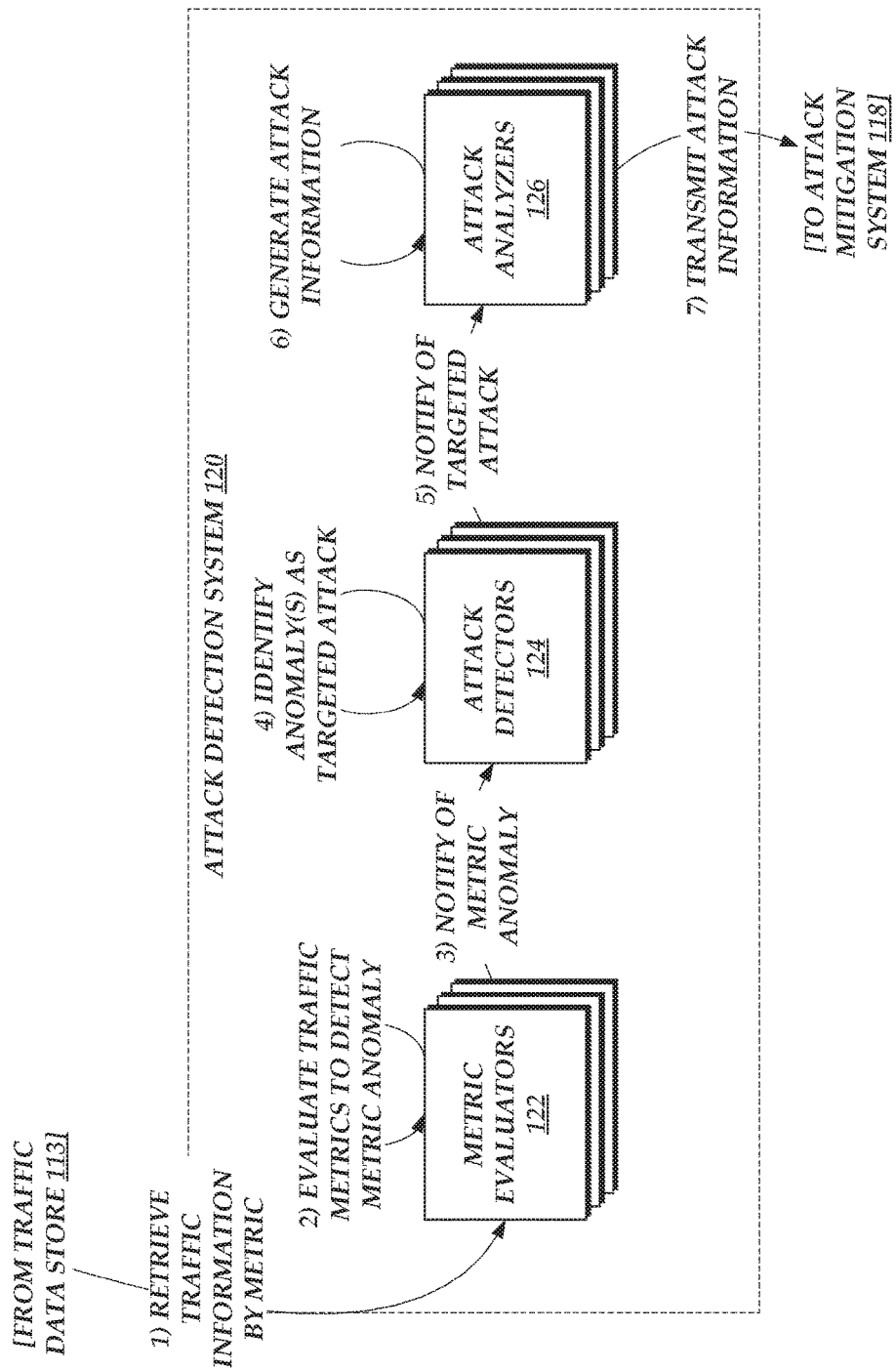
FIG. 4 is a block diagram depicting illustrative interactions of the attack detection system of FIG. 1 to detect a network attack on the content delivery system.

FIG. 4 depicts a set of illustrative interactions for utilizing traffic information gathered from network devices 112 to detect a network attack observed at a network device 112. Specifically, the interactions of FIG. 4 reflect the use of the attack detection system to identify at least one anomaly within the traffic information, to determine that the identified anomaly corresponds to a network attack, and to analyze the detected attack. The interactions begin at (1), where the metric evaluators 122 within the attack detection system 120 obtain traffic information from the traffic data store 113. In one embodiment, a single metric evaluator 122 may evaluate all traffic information from all network devices 112. In another embodiment, a number of metric evaluators 122 may evaluate traffic information, with each evaluator 122 programmed to evaluate the traffic information according to one or more of location, characteristic of the information (e.g., source address, destination address, protocol, etc.), or algorithm by which the information is evaluated. Illustratively, a first set of metric evaluators 122 may evaluate traffic information according to a first algorithm, such as an entropy change detection algorithm, while a second set of metric evaluators 122 may evaluate traffic information according to a second algorithm, such as a spike detection algorithm. Further, each set of metric evaluators 122 may include different evaluators 122 programmed to evaluate traffic according to a different metric or characteristic (e.g., source address, protocol, destination address, etc.). Accordingly, in one embodiment, each metric evaluator 122 obtains only that traffic information that is relevant to its own function (e.g., by querying the traffic data store 113 for traffic information corresponding to a location or characteristic evaluated by the metric evaluator 122). Advantageously, utilizing a variety of metric evaluators 122 to process traffic information concurrently can enable the attack detection system 120 to quickly and easily scale traffic evaluation and provide redundancy in that evaluation.

In one embodiment, one or more metric evaluators 122 can evaluate traffic to detect uncharacteristic changes in entropy of the traffic, when organized according to a given characteristic or set of characteristics. Entropy (which is sometimes referred to as "Shannon entropy") provides a value by which the total expected information content within a distribution of data can be evaluated. Moreover, the entropy of a distribution generally changes proportional to the overall change in that distribution. In the example of network communications, where a distribution reflects the percentages of network traffic at a certain location that correspond to various protocols (e.g., TCP, UDP, etc.), a large increase in the percentage of traffic attributable to a given protocol relative to other protocols will cause a corresponding increase in the entropy of the distribution, even where the overall volume of traffic does not change. Because network attacks generally cause large changes in the distribution of traffic at a location, a rapid change in entropy can be used to detect such network attacks, even where other factors (e.g., rate limiting or throttling) cause the absolute volume of traffic to remain constant.

In one embodiment, entropy for a distribution of values represented as the set X can be defined as:

$$H(X) = -\sum_{x \in X} p(x) \log_2 p(x)$$

where the function p(x) reflects the proportion of traffic sharing an individual characteristic from among a number of possible characteristics (e.g. sharing a common source IP address, a common protocol, common country of origin, etc.). For example, where the source IP addresses corresponded to all traffic at a location, and were associated with equal amounts of traffic at the location (according to a variety of potential volume metrics, e.g., half of all data packets, half of the bytes seen at a location, half of all requests, etc.), the function p( ) for each IP address would equal ⅓, and the total entropy would be roughly −1.56. In comparison, if one source IP address were associated with all traffic over a location, p( ) for that address would equal 1, and the total entropy would equal zero. Thus, independent of the volume of traffic over a location, entropy calculation can allow the metric evaluator 122 to quantify the overall distribution of traffic at a location.

Illustratively, a metric evaluator 122 associated with a location and a characteristic may compare the entropy for recent traffic, grouped according to the characteristic, to previously recorded entropies of traffic at the location and grouped according to the characteristic. In one embodiment, the metric evaluator 122 can maintain a history of entropies for traffic at a given location and grouped according to a characteristic, and calculate statistical information for such entropies, such as a mean entropy, standard deviation of the entropy, mean rate of change of entropy, and standard deviation of that rate of change. The statistical information may reflect a large history of traffic at a location and grouped according to a characteristic, relative to the time period being assessed for potential network attacks. For example, where the metric evaluators 122 assess entropy of traffic each minute, the statistical information may reflect mean entropy and a standard deviation from that mean for a period of seven days. The statistical information may further reflect only specific entropy values from that past time period, such as similar time periods in the day (e.g., data from prior days collected plus or minus one hour in the day from the current time). In some instances, the statistical information may omit specific periods, such as periods where the location experienced network outages or network attacks. The statistical information may be stored at the metric evaluator 122 itself, or at another location (e.g., the traffic data store 113), and may be updated continuously (e.g., as entropies for new traffic is computed) or periodically (e.g., each day).

While the attack detection system is sometimes described as detecting anomalies relative to an average statistical value of prior traffic information (e.g., average or mean entropy, average rate of change in entropy, etc.), in some embodiments, the attack detection system may additionally or alternatively detect anomalies relative to other statistical values. Such values are generally referred to herein as "baseline" values, and may include (by way of non-limiting examples), average values, median values, modal values, or any other statistical value representative of past traffic that may be compared to a corresponding statistical value regarding current traffic to detect an anomaly with respect to that current traffic. Furthermore, while the attack detection system is sometimes described herein as utilizing a threshold based on standard deviations to detect anomalous traffic data, the attack detection system may additionally utilize thresholds based on other measurements of statistical dispersion, or on a combination of measures of statistical dispersion. Examples of measurements of statistical dispersion include, but are not limited to, standard deviation, interquartile range, range, mean absolute difference, mean absolute deviation, average absolute deviation, coefficient of variation, and relative mean difference.

Returning to the interactions of FIG. 4, at (2), each metric evaluator 122 may evaluate the entropy for a given volume of prior traffic (e.g., the prior minute) grouped according to a given characteristic, and compare the entropy of that traffic to corresponding entropies of past traffic. The metric evaluator 122 may then determine whether the current entropy is anomalous with respect to prior entropies. In one embodiment, anomalous entropies may be determined according to a threshold set relative to a standard deviation of data. For example, where a current entropy differs from prior mean entropy by more than n standard deviations (e.g., 5), the metric evaluator 122 may determine that an anomaly has occurred. As a further example, where a current entropy shows a rate of change (e.g., relative to past entropies) that differs from an average historical entropy rate of change by more than n standard deviations, the metric evaluator 122 may determine that an anomaly has occurred, which may be indicative of a network attack.

In addition or alternatively to entropy, one or more metric evaluators 122 may be programmed to determine spikes in traffic at a location, by comparing volumes of traffic to historical volumes. In one embodiment, a metric evaluator 122 may detect an anomaly when a current volume of traffic (e.g., for the past x minutes) exceeds a prior average volume of traffic (e.g., for the past n days) by more than i (e.g., 5) standard deviations. In another embodiment, a metric evaluator 122 may detect an anomaly when a current volume of traffic (e.g., for the past x minutes) shows a relative change in traffic volume compared to a prior similar period in time that exceeds a prior average change in traffic volume (e.g., for the past n days) by more than i standard deviations. The specific parameters used to compare current traffic to prior traffic may be set according to the needs of the system (e.g., by an administrator). In some instances, multiple metric evaluators 122 may be utilized that employ the same algorithm with different tuning parameters (e.g., length of history, number of standard deviations to detect an anomaly), in order to test the specific parameters that provide optimal results. In some instances, metric evaluators 122 may be programmed to detect spikes in overall traffic (e.g., total packets, bytes, requests, etc.). In other instances, metric evaluators 122 may be programmed to detect spikes in specific types of traffic (e.g., total traffic using a specific protocol, from a specific country of origin, etc.). In still other instances, metric evaluators 122 may be programmed to detect spikes in specific attributes of packets (e.g., total packet size, time between packets, etc.). As noted above, metric evaluators 122 may utilize, in addition or alternatively to average values, other baseline values, such as median or modal values. Metric evaluators 122 may also utilize, in addition or alternatively to standard deviation, other measurements of dispersion.

Moreover, in addition or alternatively to entropy and spikes, additional statistical metrics may be utilized to evaluate traffic information, and thus form the basis for establishing a baseline for historical traffic data, as well as a corresponding value from data under evaluation. These statistical metrics may include measurements of skewness, including the Fisher-Pearson coefficient of skewness, as represented by the formula:

$$g = \frac{\sum_{i=1}^{N}(Y_i - \overline{Y})^3 / N}{s^3}$$

where $\overline{Y}$ is the mean, s is the standard deviation, and N is the number of data points within the distribution. These statistical metrics may further include measurements of kurtosis, e.g., as represented by the formula:

$$\text{kurtosis} = \frac{\sum_{i=1}^{N}(Y_i - \overline{Y})^4 / N}{s^4} - 3$$

Statistical measurements may include additional measurements including but not limited to KL divergence, Sibson distance, Chi-square distance, correntropy, confidence intervals, and quantiles or percentiles. In some instances, statistical measurements may be taken after transforming traffic information into another domain, such as after transforming time-domain information regarding traffic into the frequency domain via Fourier transform (e.g., a fast Fourier transform, a discrete Fourier transform, etc.) and measuring the power spectral density or other statistical measurement applicable to the new domain.

Returning to the interactions of FIG. 4, in the instance that one or more metric evaluators 122 detect an anomaly in traffic at a location, the metric evaluators 122, at (3), notify the attack detectors 124 of those anomalies. The attack detectors 124 are programmed, at (4), to identify attacks on locations within the content delivery system 110 based on the anomalies. In one embodiment, the attack detectors 124 may identify an attack when at least a threshold number (e.g., 2) of anomalies are detected at a location. In another embodiment, the attack detectors 124 may identify an attack when at least a threshold number of unrelated anomalies are detected at a location. For example, the attack detectors 124 may identify a network attack when there is both an anomaly with respect to a spike in total traffic and an anomaly in entropy associated with traffic protocol, as these anomalies are likely to represent independent indicators of a possible attack (e.g., a UDP-flood type attack). As a counter example, the attack detectors 124 may not identify a network attack when anomalies are detect as a spike in network traffic to a specific port (e.g., TCP port 80) and a spike in traffic of a protocol associated with that port (e.g., TCP), as these anomalies likely represent interrelated indicators, and thus may not satisfy the threshold for unrelated anomalies detected. Relationships between anomalies may be specified according to rules input to the attack detectors 124 (e.g., by an administrator), or according to automatic analysis by the attack detectors 124 (e.g., by processing historical anomaly detections according to a machine learning algorithm to determine that two anomalies are highly correlated). The attack detectors, additionally or in alternative to utilizing anomaly thresholds, may also utilize other algorithms or techniques for identifying network attacks on a location according to anomaly data. For example, attack detectors may utilize machine learning techniques to process historical anomaly data and determine, for any newly detected anomaly, the probability that the anomaly corresponds to an attack. In one embodiment, each attack detector 124 may process anomalies corresponding to a single location. In another embodiment, an attack detector 124 may process anomalies corresponding to multiple locations. In yet another embodiment, multiple attack detectors 124 may process anomalies corresponding to a single location, but may utilize different parameters or algorithms for identify network attacks based on the anomalies.

At (5), when an attack detector 124 identifies a network attack on a location, the attack detector 124 notifies an attack analyzer 126 of the attack. As shown in FIG. 4, the attack detection system 120 may include a plurality of attack analyzers 126. In one embodiment, each attack analyzer 126 is associated with one or more specific locations and is notified of attacks on those locations. In another embodiment, the attack analyzers 126 may not be associated with specific locations, but may provide redundancy in analyzing detected attacks.

At (6), the attack analyzer 126 can generate additional attack information for the detected attack. Illustratively, the attack analyzer 126 may obtain traffic information for the location where the attack was observed (e.g., from the traffic data store 113), and determine a destination network address associated with the attack (e.g., a destination network address to which anomalous packets were directed). This destination network address may indicate a target of the attack. In some embodiments, the attack analyzer 126 may further attempt to generate a signature for the attack, which may be utilized to identify and isolate or drop malicious packets of the attack, as described in more detail, e.g., in the '795 Patent.

Thereafter, at (7), the attack analyzer 126 transmits the attack information, including for example the location at which the attack was observed, the times at which the attack was observed, the anomalies corresponding to the attack, and a destination network address associated with the attack, to attack mitigation system 118 programmed to attempt to mitigate the attack. Mitigation of network attacks is beyond the scope of the present disclosure, but is described in more detail, e.g., in the '795 Patent.

Figure 5:
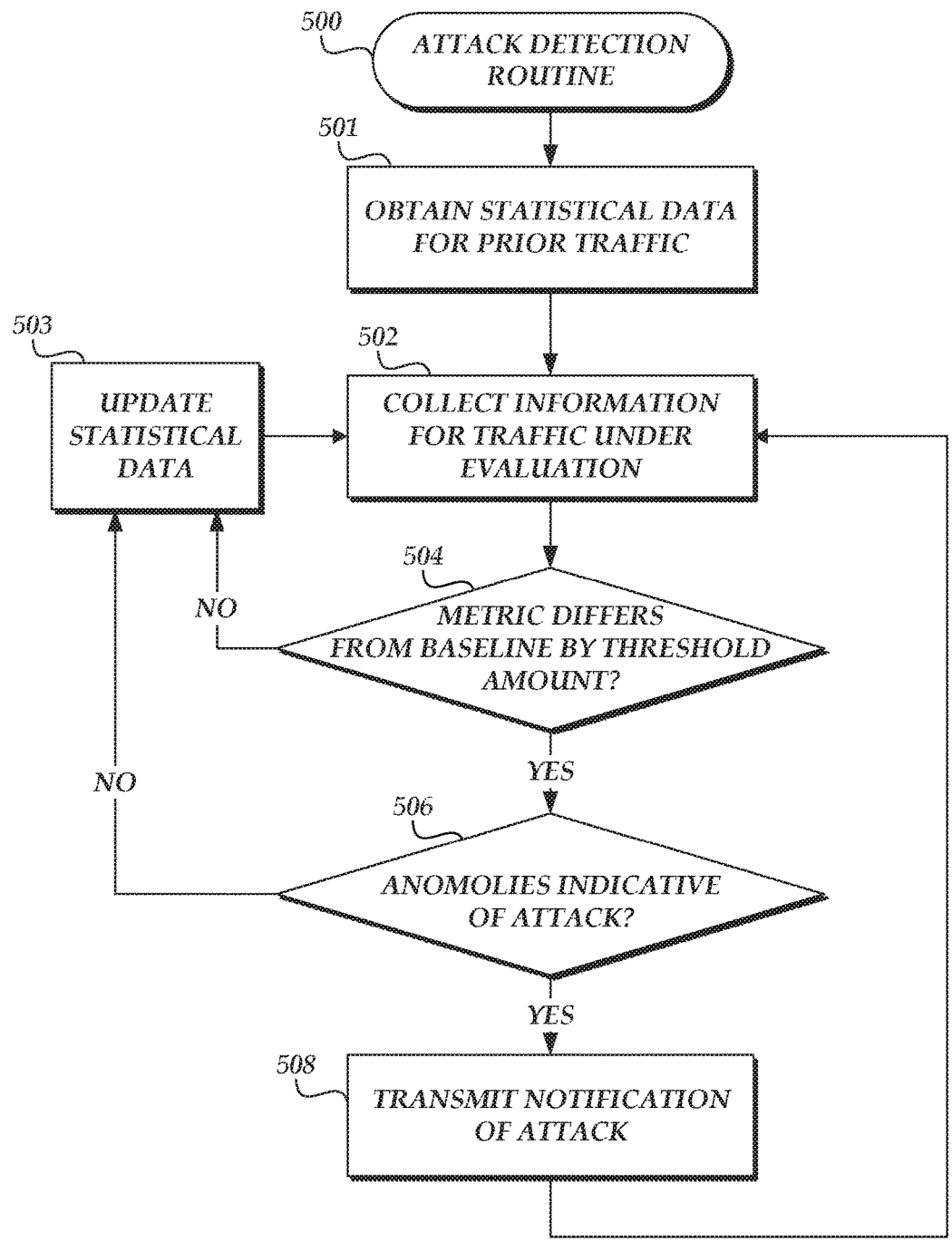
FIG. 5 is a flow chart depicting an illustrative routine for identifying network attacks based on evaluation of traffic metrics regarding network communications.

With reference to FIG. 5, one illustrative routine 500 for detecting network attacks within a content distribution system is described. The routine 500 may be carried out, for example, by the attack detection system 120 of FIG. 1, either alone or in conjunction with additional elements of the content delivery system 110.

The routine 500 begins at block 501, where the attack detection system 120 obtains statistical data for prior traffic, that can be utilized to determine a baseline value and dispersion for comparison to currently evaluated traffic. In one embodiment, the attack detection system 120 may obtain statistical data by retrieving the data from a remote source, such as a data store. In another embodiment, the attack detection system 120 may obtain statistical data by generating the statistical data directly (e.g., from historical traffic information). The statistical data may generally reflect traffic over a period of time that is relatively large compared to the period corresponding to traffic that is to be evaluated. For example, the statistical data may reflect seven days work of "normal" traffic (e.g., excluding periods where an attack is observed), in order to detect attacks within a given one minute period of traffic. In some instances, the statistical data may reflect only comparable time periods to the period under evaluation (e.g., similar times of day, similar times of year, etc.). The statistical data can generally include a baseline value (e.g., mean, median, or mode of absolute volume, entropy, rates of change, etc.) and a measurement of dispersion (e.g., standard deviation, etc.).

The routine 500 then continues at block 502, where the attack detection system 120 collects traffic information from a location within the content delivery system. As described above, locations may correspond to any node within the system, including networking devices (e.g., routers), servers, etc. In one embodiment, the attack detection system 120 may collect the traffic information by retrieving that information from a data store, such as the traffic data store 113, to which the locations have published the information. In another embodiment, the attack detection system 120 may collect traffic information by interacting with one or more locations to retrieve the traffic information. Traffic information may include any details regarding network traffic observed at a location, including but not limited to packet captures, flow information, or aggregated information derived from packet captures or flow information.

Thereafter, at block 504, the attack detection system 120 evaluates the traffic metrics to determine anomalies at any location. More specifically, the attack detection system 120 determines whether a metric of the traffic under evaluation differs from a baseline of the prior traffic by at least a threshold proportional to a measurement of dispersion of the prior traffic (e.g., n standard deviations from an average entropy). As noted above, the attack detection system 120 may detect such anomalies by utilizing multiple, concurrently processing metric evaluators, each of which consumes a portion of the traffic information (e.g., corresponding to one or more locations and grouped or filtered according to one or more characteristics) and evaluates such a portion to detect anomalies relative to corresponding historical traffic information. In one embodiment, one or more metric evaluators inspect the traffic information to determine anomalies with respect to the entropy of a distribution of traffic at a given location (e.g., as distributed according to one or more characteristics of the traffic). Additionally or alternatively, one or more metric evaluators inspect the traffic information to determine anomalous spikes in traffic sharing a given characteristic at a given location.

In the instance that no anomalous traffic is detected at block 504 (e.g., a metric of the evaluated traffic does not differ from a baseline of historic traffic by the requisite threshold), the routine 500 continues to block 503, where the attack detection system 120 can update the statistical data of prior traffic based on the traffic under evaluation. By continuously updating the statistical data, the attack detection system 120 can ensure that new traffic is evaluated relative to up-to-date traffic information.

In the instance that anomalous traffic is detected at block 504, the routine 500 continues at block 506, where the attack detection system 120 determines whether detected anomalies at a location indicate a network attack at that location. In one embodiment, the attack detection system 120 may determine that a network attack has or is occurring when at least a threshold number of anomalies are detected at a location. In another embodiment, the attack detection system 120 may determine that a network attack has or is occurring when at least a threshold number of independent or unrelated anomalies are detected at the location. In still more embodiments, the attack detection system may utilize machine learning techniques to process historical anomaly data and determine, for any newly detected anomalies, the probability that the anomalies corresponds to an attack.

In the instance that the attack detection system 120 determines that the anomalies are not indicative of a network attack, the routine 500 returns to block 503, as described above. Alternatively, in the instance that the attack detection system 120 determines that the anomalies are indicative of a network attack, the routine 500 continues to block 508, where the attack detection system 120 transmits a notification of the attack to one or more components of the content delivery system (or other communications network). Illustratively, the attack detection system 120 may notify a computing device associated with an administrator of the content delivery system, or may notify one or more devices configured to automatically analyze or mitigate the network attack. The routine 500 then returns to block 502, and may continue indefinitely (e.g., until halted by an external process or by an administrator).

One skilled in the art will appreciate that the routine 500 may include fewer or more interactions than described above. Illustratively, in addition to transmitting a notification of an attack at block 508, the attack detection system 120 itself may conduct an analysis of the attack. For example, the attack detection system 120 may retrieve traffic information corresponding to the attack (e.g., contributing to the anomaly that led to detection of the attack), and determine one or more destination network addresses associated with the traffic information. The attack detection system 120 may then determine that those destination addresses may represent a target of the network attack. Additionally or alternatively, the attack detection system may integrate other components or techniques to analyze network attacks, such as those described within the '227 Patent, or may integrate components or techniques programmed to mitigate network attacks, such as those described within the '795 Patent. Accordingly, the interactions of routine 500 are intended to be illustrative in nature, rather than exhaustive.

All of the methods and processes described above may be embodied in, and fully automated via, software code modules executed by one or more general purpose computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for detecting malicious traffic on a communication network, the system comprising:
    a data store including historical traffic data for a communication node of the communication network, wherein the historical traffic data includes statistical information regarding data packets received at the communication node during a first period of time, the statistical information including at least an average entropy value and a standard deviation of entropy;
    a computing device configured with computer-executable instructions that, when executed, cause the computing device to:
        obtain traffic information regarding a set of data packets received at the communication node over a second period of time;
        calculate an entropy value for the traffic information;
        determine that the entropy value for the traffic information differs from the average entropy value by at least a threshold number of standard deviations;
        detect that a network attack is occurring at the communication node based at least in part on the entropy value for the traffic information differing from the average entropy value by at least the threshold number of standard deviations; and
        transmit a notification indicating that a network attack has been observed at the communication node.

2. The system of claim 1, wherein the network attack is a denial of service (DoS) attack.

3. The system of claim 1, wherein the communication node is at least one of a router, a switch, a server, or a computing device configured to implement functionality of a router, a switch or a server.

4. The system of claim 1, wherein the entropy value is calculated according to a distribution of the set of data packets, distributed according to a characteristic of data packets within the set of data packets.

5. The system of claim 4, wherein the characteristic is at least one of packet size, protocol, port, source network address, destination network address, geographical location associated with the source network address, inter-packet arrival time, ingress interface, or type of service.

6. The system of claim 4, wherein the entropy value is calculated according to proportions of the set of data packets sharing a value for the characteristic, and wherein the proportions are proportions of at least one of bytes, number of packets, and number of requests.

7. A computer-implemented method for detecting malicious traffic on a communication network, the computer-implemented method comprising:
    receiving historical traffic data for a communication node of the communication network, wherein the historical traffic data includes statistical information regarding data packets received at the communication node during a first period of time, the statistical information including at least an average entropy value and a dispersion value;
    receiving traffic information regarding a set of data packets received at the communication node over a second period of time;
    calculating an entropy value for the traffic information;
    determining that the entropy value for the traffic information differs from the average entropy value by at least a threshold number, the threshold number based at least in part on the dispersion value;
    detecting that a network attack is occurring at the communication node based at least in part on the entropy value for the traffic information differing from the average entropy value by at least the threshold number; and transmitting a notification indicating that a network attack has been observed at the communication node.

8. The computer-implemented method of claim 7, wherein the communication node is at least one of a router, a switch, a server, or a computing device configured to implement functionality of a router, a switch or a server.

9. The computer-implemented method of claim 7, wherein the dispersion value is at least one of standard deviation, interquartile range, range, mean absolute difference, mean absolute deviation, average absolute deviation, coefficient of variation, or a relative mean difference.

10. The computer-implemented method of claim 7, wherein the statistical information further includes (i) an average volume of data packets sharing a first characteristic and (ii) a dispersion value for the average volume, and wherein the computer-implemented method further comprises:

calculating a volume of data packets, from the set of data packets, that share the characteristic; and determining that the volume of the data packets that share the first characteristic differs from the average volume of data packets sharing the first characteristic by at least the threshold number; and wherein detecting that the network attack is occurring is further based at least in part on the volume of the data packets that share the characteristic differing from the average volume of data packets sharing the characteristic by at least the threshold number.

11. The computer-implemented method of claim 7, wherein the notification is transmitted to at least one of a computing device associated with an administrator of the communication network or a computing device configured to mitigate the network attack.

12. The computer-implemented method of claim 7, wherein the notification is transmitted to a computing device configured to generate a signature for the network attack based at least in part on comparing information regarding the data packets received at the communication node during a first period of time and information regarding the set of data packets received at the communication node over the second period of time.

13. The computer-implemented method of claim 7 further comprising determining a potential target of the network attack at least partly by determining a destination network address associated with the set of data packets.

14. Non-transitory computer-readable media including computer-executable instructions that, when executed by a computing system, cause the computing system to:

obtain historical traffic data for a communication node of the communication network, wherein the historical traffic data includes information regarding a first set of data packets received at the communication node during a first period of time, the information including at least a baseline value of the first set of data packets and a measurement of dispersion of the baseline value;

obtain information regarding a second set of data packets received at the communication node over a second period of time;

determine that the information regarding the second set of data packets differs from the baseline value by at least a threshold number, the threshold number based at least in part on the measurement of dispersion;

detect that a network attack is occurring at the communication node based at least in part on the second set of data packets differing from the baseline value by at least a threshold number; and transmit a notification indicating that a network attack has been observed at the communication node.

15. The non-transitory computer-readable media of claim 14, wherein detecting that the network attack is occurring is further based at least in part on one of a volume of data packets sharing a characteristic, an entropy of a distribution of data packets sharing the characteristic, a rate of change of the volume, or a rate of change of the entropy.

16. The non-transitory computer-readable media of claim 15, wherein the volume is calculated based on at least one of a number of bytes, a number of packets, or a number of requests.

17. The non-transitory computer-readable media of claim 14, wherein the baseline value represents at least one of a mean, median or mode of an attribute of the first set of data packets.

18. The non-transitory computer-readable media of claim 14, wherein the information further includes at least a second baseline value of the first set of data packets and a measurement of dispersion of the second baseline value, and wherein the computer-executable instructions further cause the computing system to determine that the second set of data packets differs from the second baseline value by at least a second threshold number, the second threshold number based at least in part on the measurement of dispersion of the second baseline value, and wherein detecting that a network attack is occurring is further based at least in part on the second set of data packets differing from the second baseline value by at least the second threshold number.

19. The non-transitory computer-readable media of claim 14, wherein the notification is transmitted to a component of the communication network wherein the component is a computing device configured to generate a signature for the network attack based at least in part on comparing information regarding the first set of data packets and information regarding the second set of data packets.

20. The non-transitory computer-readable media of claim 14, wherein the computer-executable instructions further cause the computing system to determine a potential target of the network attack at least partly by determining a destination network address associated with the second set of data packets.

21. The non-transitory computer-readable media of claim 14, wherein the computer-executable instructions further cause the computing system to:

obtain information regarding a third set of data packets received at the communication node over a third period of time;

determine that the information regarding the third set of data packets does not differ from the baseline value of the first set of data packets by at least the threshold number; and update the historical traffic data for the communication node based at least partly on the information regarding the third set of data packets.

* * * * *